(12) United States Patent
Holmes

(10) Patent No.: US 6,945,858 B1
(45) Date of Patent: Sep. 20, 2005

(54) METHOD FOR MANUFACTURING NON-SEAMED STONE CORNERS FOR VENEER STONE SURFACES

(76) Inventor: Mark J Holmes, P.O. Box 401, Haymarket, VA (US) 20168

( * ) Notice: Subject to any disclaimer, the term of this patent is extended or adjusted under 35 U.S.C. 154(b) by 0 days.

(21) Appl. No.: 10/682,431

(22) Filed: Oct. 10, 2003

Related U.S. Application Data

(63) Continuation-in-part of application No. 10/195,435, filed on Jul. 16, 2002, now Pat. No. 6,659,099.

(51) Int. Cl.[7] .............................................. B24C 1/04
(52) U.S. Cl. .................. 451/57; 125/13.01; 125/23.01; 125/16.04; 451/37
(58) Field of Search .......................... 125/23.01, 13.01, 125/16.04; 451/57, 37; 83/877, 878

(56) References Cited

U.S. PATENT DOCUMENTS

| | | | | |
|---|---|---|---|---|
| 2,344,003 A | * | 3/1944 | Sheptinsky | 83/407 |
| 4,372,174 A | * | 2/1983 | Cymbalisty et al. | 73/863.11 |
| 5,189,939 A | * | 3/1993 | Allen, Jr. | 83/878 |
| 5,758,634 A | * | 6/1998 | Ellison, Jr. | 125/23.01 |
| 6,659,099 B2 | * | 12/2003 | Holmes | 125/23.01 |

* cited by examiner

Primary Examiner—George Nguyen
(74) Attorney, Agent, or Firm—Whitham, Curtis & Christofferson, PC

(57) ABSTRACT

A method is disclosed for constructing non-seamed stone corners for use on outside edges formed by joining thin stone walls at right angles. Thin stone is used to lay the field of the walls. Then a building stone is oriented and fed down a chute, having perpendicular sides, through two stone cutting saws at right angles to one another, where the distance between the saw blades and the sides of the chute correspond to the thickness of the respective thin stone walls, and where the cutting edges of the saw blades have a clearance between them of about one-eighth of an inch. A residual piece is removed from the cut building stone, leaving a corner stone. These corner stones are laid on the corner formed by the right angle joint between the walls, giving the illusion of a thick building stone wall with nearly the low cost and easy laying of thin stone. Where the residual piece is large enough, it is used to cut a second corner stone in the same manner.

10 Claims, 16 Drawing Sheets

METHOD FOR MANUFACTURING NON-SEAMED STONE CORNERS FOR VENEER STONE SURFACES

This application is a continuation in part from application Ser. No. 10/195,435 filed Jul. 16, 2002 now U.S. Pat. No. 6,659,099 of the same title.

BACKGROUND OF THE INVENTION

1. Field of the Invention

The present invention generally relates to stone masonry, and in particular to the construction of stone surfaces and corners using veneer stone.

2. Background Description

Formerly stone is laid as a structural component or as an aesthetic cladding or veneer on houses, buildings, walls, chimneys and as paving or flooring.

Stone comes in different types: thin stone one-half inch to three inches thick that is either a field stone or is quarried and split to the appropriate size; and building stone, which is a three inch to nine inch thick stone that is either a field stone or is quarried and split to the appropriate size. Thin stone and building stone are generally the same stone except for their different thicknesses.

There are many other types of stone: flag stone, granite, marble, dimensional stone that typically comes in thin panels flat or polished. Also there are boulders and edging, none of which are of concern to the present invention. Only thin stone and building stone are of concern to the present invention.

The advantages and disadvantages of thin stone are as follows. Thin stone is inexpensive to buy, easy and inexpensive to lay, and easy and inexpensive to transport. However, thin stone leaves an unsightly joint on the outside corners of the wall, house, building or whatever is being laid. At the outside corners, the thickness of the stone can be readily ascertained because the thin edge of the stone is visible, which shatters the illusion of a thick (4 inch to 9 inch) stone cladding most preferred by customers. It should be noted that inside corners are not a problem, because the thin edges do not show and there is no difference in the appearance between building stone and thin stone. The difficulty is with the external corner.

There are two inadequate solutions in the prior art. First, building stone is laid instead of thin stone, which solves the problem of unsightly corners of thin stone. The down side of building stone is it's expensive to buy, hard and expensive to lay, and heavy and expensive to transport.

Second, culture or imitation stone may be used to provide an illusion of thick stone at the corners. Culture stone is made of poured and cast concrete to which is applied a thin cladding layer of simulated rock on the front and edges. Culture stone comes in a two part system. Flat stones (½ inch to 3 inch thick) laid on the wall surface and corner pieces shaped like a 90 degree "L" (½ inch to 3 inches thick) laid on the corners of the wall. Laid together, these surface and corner pieces give the illusion of thick stone, but it is light in weight compared to thick stone and it has the easy laying character of thin stone.

The drawbacks to this solution are as follows: culture stone costs as much per square foot of surface area as thick building stone. Culture stone can't be cleaned with commercial acid based masonry cleaners to remove mortar stains, as this would corrode the "stone" appearance and void the warranty. Culture stone can't be used in constant contact with water (ponds, swimming pools and the like), unlike real stone. Furthermore, culture stone doesn't lend itself to fit and finish as well as thin stone. Typically, thin stone is trimmed a bit with a hammer and/or flipped over to fit in various spots in a wall. FIG. 2A shows a thin stone 200 with edges 210. Trimming the thin stone 200 reveals a new edge 220, which has the same texture and attributes as the stone itself. Culture stone trimmed up exposes the unsightly inside of the piece since the stone look of the piece is provided by a thin coating. Culture stone can't be flipped over to fit a space since the coating is only on the front. FIG. 2B shows a culture stone 250 with edges 260. Trimming the culture stone 250 reveals a new edge 270, which does not have the cladding of edges 260. Instead, the edge 270 shows a cladding layer 275 (not shown to scale) formed over concrete 280.

It is to be noted that another potential solution is not workable. Culture stone corners cannot be used with thin stone walls because the texture of the culture stone cladding is noticeably different from thin stone, and makes the corners unsightly on that account.

SUMMARY OF THE INVENTION

It is therefore an object of the present invention to provide a way of constructing outside corner stones for veneer stone surfaces which hide the seams which appear when thin stone veneer is used at the corners.

Another object of the invention is to provide for efficient use of building stone by making two outside corner stones from a single building stone.

The invention is implemented as follows. On a typical wall utilize thin stone to lay the field of the wall. Then cut 90 degree corners out of building stone squares and rectangles so as to leave a corner piece ½ inch to 3 inch thick to match the thickness of the thin stone on the field of the wall. Lay these on the corners of the wall. This will give the illusion of a thick building stone wall with nearly the low cost and easy laying of thin stone; the wall with these corner pieces costs much less than a wall laid with culture stone, and is nearly as light.

In one embodiment, the method of the invention constructs non-seamed stone corners for first and second thin stone walls of thickness T1 and T2, respectively, joined at right angles at an external edge, by selecting a building stone having a height H, a depth D and a width W, the building stone having top and bottom surfaces H1 and H2, respectively, front and back surfaces D1 and D2, respectively, and left and right surfaces W1 and W2, respectively. Then a first cut is made in the selected building stone, the plane of the first cut being parallel to the plane of surface W1 and extending to a uniform depth from surface H1, such that the distance between the plane of the first cut and the plane of surface W1 is T1, and such that the uniform depth is equal to (H-T2). Then a second cut is made in the building stone, the plane of the second cut being parallel to the plane of surface H1 and extending to a second uniform depth from surface W2, such that the distance between the plane of the second cut and the plane of surface H2 is T2, and such that the second uniform depth is equal to (W-T1).

These two cuts separate from the building stone a residual piece, leaving a corner stone. In a further embodiment of the invention, the residual piece is large enough for use in making a second corner stone. The residual piece is re-oriented as a workpiece so that neither the left surface nor the bottom surface is formed by either the first cut or the second cut, since the left and bottom surfaces (as viewed in preparation for the initial cut) will show on the corner and should be a natural stone surface rather than a saw cut surface. Three such re-orientations are possible. After such re-orientation, the residual piece will have a height H', a width W' and a depth D'. The residual piece will also have top and bottom surfaces H'1 and H'2, respectively, left and right surfaces W'1 and W'2 respectively, and front and back surfaces D'1 and D'2, respectively. Essentially the same method used to create the first corner stone is then used upon the re-oriented residual piece to create a second corner stone. A third cut is made in the residual piece, the plane of the third cut being parallel to the plane of surface W'1 and extending to a third uniform depth from surface H'1, such that the distance between the plane of the third cut and the plane of surface W'1 is T1, and such that the third uniform depth is equal to (H'−T2). A fourth cut is made in the residual piece, the plane of the fourth cut being parallel to the plane of surface H'1 and extending to a fourth uniform depth from surface W'2, such that the distance between the plane of the fourth cut and the plane of surface H'2 is T2, and such that the fourth uniform depth is equal to (W'−T1).

In a second embodiment, as in the first, the method of the invention constructs non-seamed stone corners for first and second thin stone walls of thickness T1 and T2, respectively, joined at right angles at an external edge, by selecting a building stone having a height H, a depth D and a width W, the building stone having top and bottom surfaces H1 and H2, respectively, front and back surfaces D1 and D2, respectively, and left and right surfaces W1 and W2, respectively. The two cuts necessary to produce the non-seamed stone corner are made simultaneously by orienting the stone in a right angled trough which slopes downward and within which is mounted circular saw blades at right angles to one another. The saw blades rotate in planes parallel to the respective sides of the trough and are adjusted so that the distances between the blade and the side of the trough are T1 and T2, respectively. It is sufficient if the clearance between the cutting edges of the blades is about an eighth of an inch. The dimensions H and W of the stone block must be less than the diameter of the respective saw blades, but the depth D can be longer.

In this embodiment, in order to provide for control of thicknesses T1 and T2, the respective saw blades are mounted so as to allow for two degrees of freedom. A first degree of freedom is the distance between the plane of the saw and the plane of the side of the trough which is parallel to the plane of the saw. A second degree of freedom is movement of the shaft of the saw blade along a line within the plane of the trough side and perpendicular to the vee of the trough, in order to achieve a separation of about an eighth of an inch between the cutting edges of the two saw blades. A further aspect of this embodiment is adjustable legs for the trough so that the downward slope of the trough for a gravity feed of the stone to be cut may be varied from about ten degrees to about eighty degrees from the horizontal.

BRIEF DESCRIPTION OF THE DRAWINGS

The foregoing and other objects, aspects and advantages will be better understood from the following detailed description of a preferred embodiment of the invention with reference to the drawings, in which:

FIG. 1A shows a stationary saw assembly. FIG. 1B shows a thick stone working piece in the saw assembly. FIG. 1C shows the working piece in the saw assembly after a first cut. FIG. 1D shows the working piece rotated in preparation for a second cut. FIG. 1E shows the rotated working piece in the saw assembly. FIG. 1F shows the working piece in the saw assembly after a second cut. FIG. 1G is a perspective diagram of a working piece showing both cuts and labeling the faces and dimensions of the working piece.

FIG. 5A shows a perspective view of the saw assembly used to cut the stone. FIG. 5B is a partial cutaway showing a slot in the chute for lateral movement of the saw shaft. FIG. 5C is a schematic showing the adjustments made in the positioning of the saw blades in order to make cuts yielding stone with side thicknesses T1 and T2.

DETAILED DESCRIPTION OF A PREFERRED EMBODIMENT OF THE INVENTION

Figure 1A:
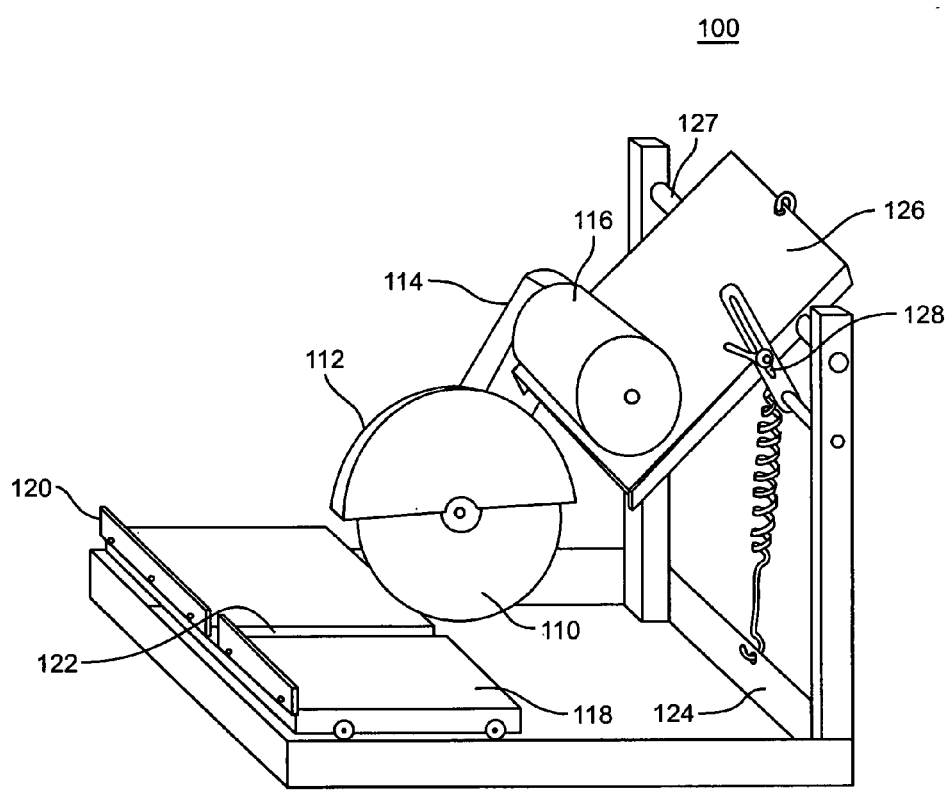
FIGS. 1A through 1G are a sequence of drawings showing how thick building stone is cut in accordance with the invention.
Figure 1B:
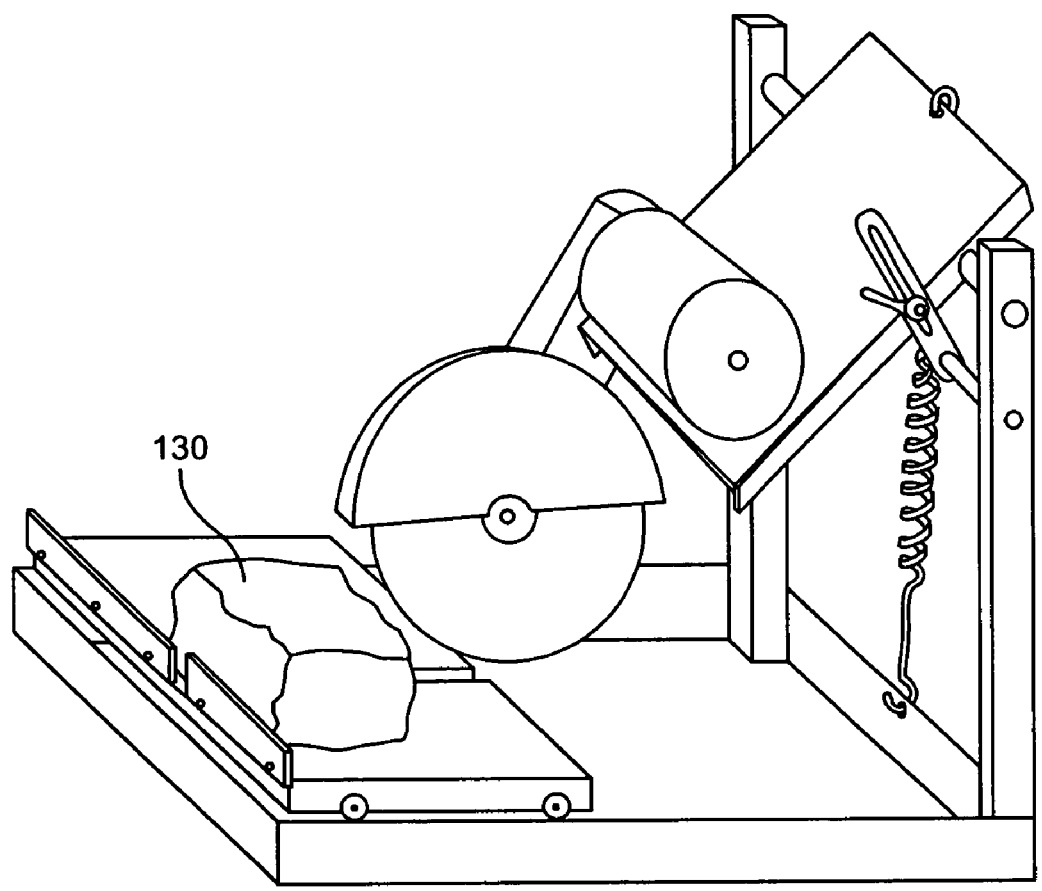

Stone corners in accordance with the invention can be made with two types of common masonry saws. The stationary saw 100 as shown in FIG. 1A can cut either wet or dry. Stone can also be cut with a hand held saw (not shown). Utilizing recent breakthroughs in stone saw blade technology, the stationary saw is the easier, safer and faster saw for implementing the invention. As shown in FIG. 1A, the stationary saw assembly includes a motor 116 connected by a drive arm 114 to saw blade 110, which is protected by a saw blade safety cover 112. The saw blade 110 is adjusted to a desired vertical height by rotating platform 126 about axis 127 and tightening adjustable brace 128. The saw blade 110 remains stationary during the cutting process. A workpiece (shown as item 130 in FIG. 1B) is placed on table 118 abutting front stop 120. Table 118 has a groove 122 to allow cutting through a workpiece.

Figure 1C:
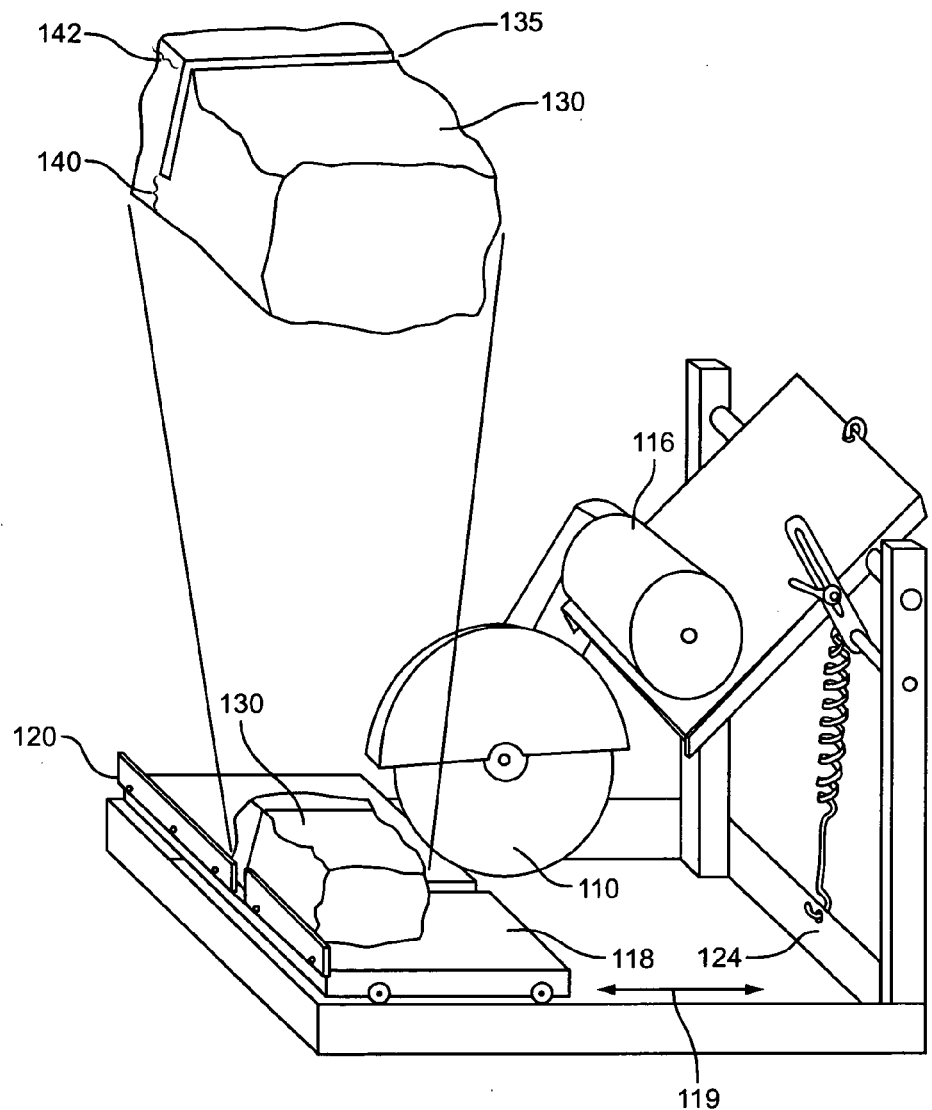

Now turning to FIG. 1C, using a typical 14 inch saw blade machine (stationary saw assembly 100), a reasonably square or rectangular stone (e.g. workpiece 130) is selected between 6 inches and 3 inches in height, 6 inches and 3 inches in width, and 10 inches and 3 inches in length. The saw blade 110 is set at a height above the table 118 equal to the thickness of the thin stone being used to lay the field of a wall (for example, 1½ inches above the table). The stone 130 is placed on the table 118, which is movable front to back (shown by arrow 119) along the plane of the saw blade 110, square to the saw blade with the length of the stone 130 parallel to the blade 110. The stone 130 is moved side to side along the front stop of the table 118 until the blade 110 would engage the stone the desired distance (for example, 1½ inches) from the left parallel face of the stone 130 when cutting commences. The saw motor 116 is turned on and the table 118 with stone 130 abutting front stop 120 is pushed entirely through the blade 110 and then pulled back to the start point. The motor 116 is then turned off. At this point stone 130 (as shown in the cutaway of FIG. 1C) has a cut 135 which leaves a stone thickness 142 (for example, 1½ inches) to the left of the cut 135 and a stone thickness 140 (for example, 1½ inches) below the cut 135. The thickness 140 and thickness 142 correspond to the thickness of the thin stone used for the field of the wall being laid.

Figure 1D:
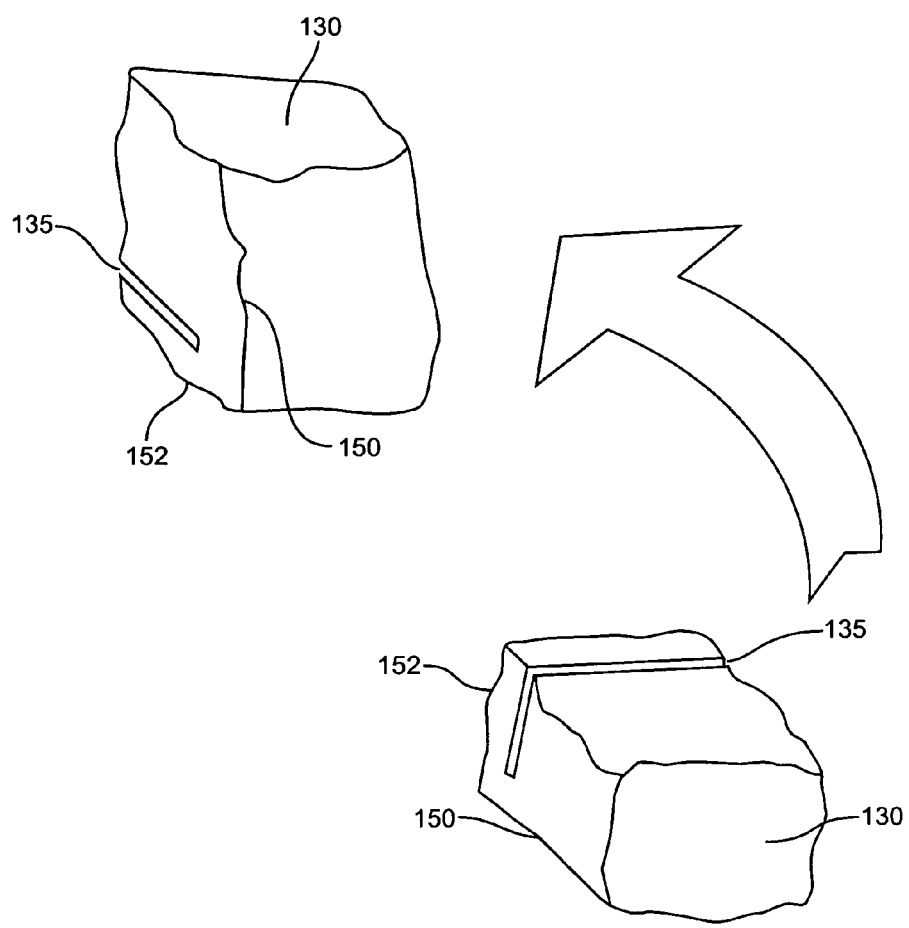
Figure 1E:
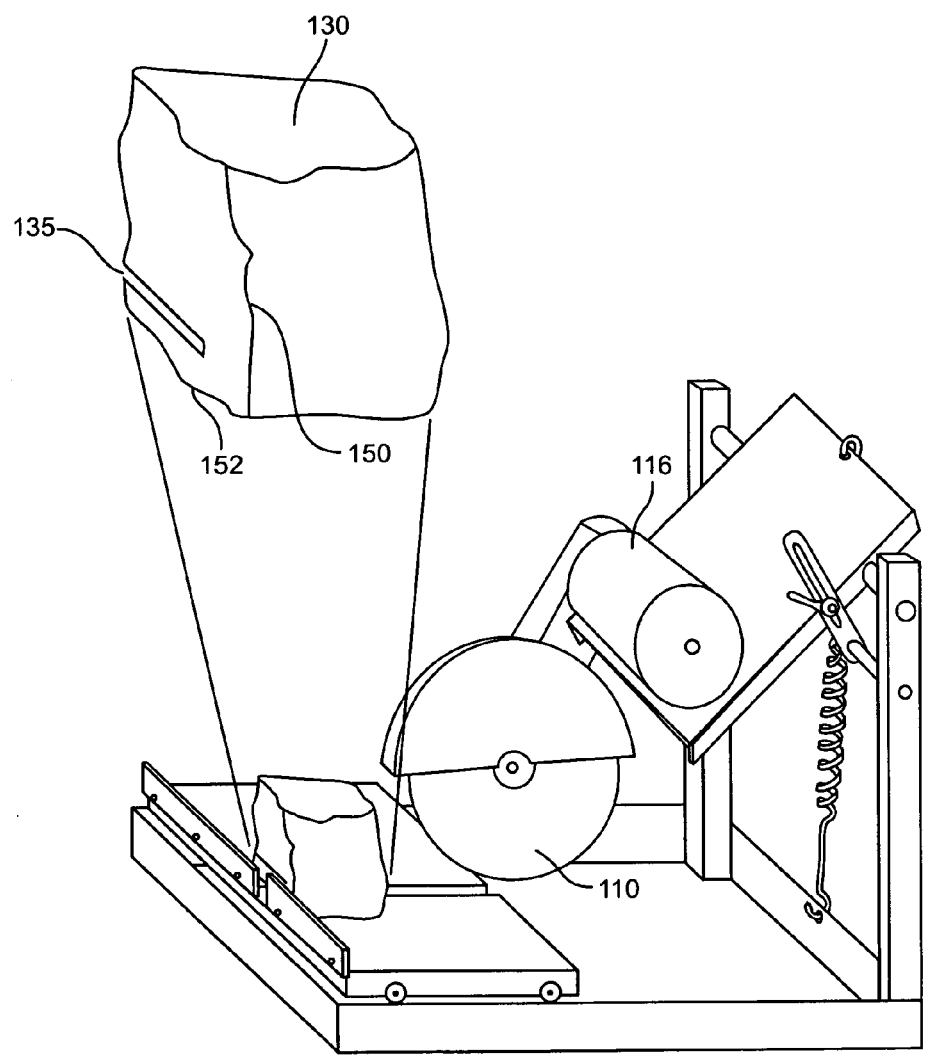
Figure 1F:
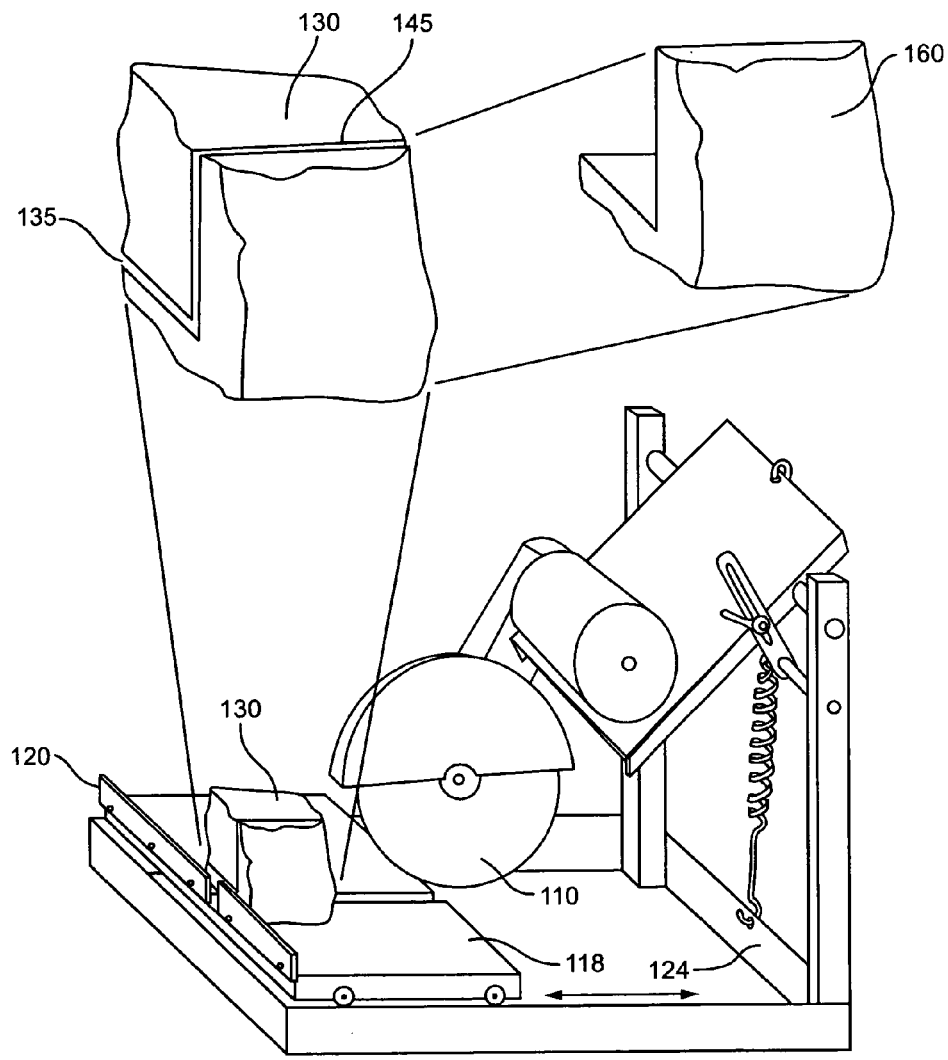

The stone 130 is then rolled to the left as shown in FIG. 1D so the former left facing face of the stone (not shown) is now face down on the table, still against the stop 120 and the length of the stone 130 is still parallel to the saw blade 110. Horizontal edge 150 is now vertical, vertical edge 152 is now horizontal, and cut 135 is now perpendicular to saw blade 110. The rotated stone 130 is shown in FIG. 1E. In preparation for the second cut, the stone 130 is moved side to side along the front stop 120 of the table 118 until the blade would engage the stone the desired distance (for example, 1½ inches) from the right parallel face of the stone when cutting commences. Turning now to FIG. 1F, the saw motor 116 is turned on and the table 118 with stone 130 abutting front stop 120 is pushed entirely through the blade 110 and then pulled back to the start point. The motor 116 is then turned off. The stone 130 now has a second cut 145, leaving corner 160. Sandblast the backside of the corner stone 160 (i.e. the surfaces formed by cuts 135 and 145) to roughen them so mortar can adhere to the stone.

Figure 1G:
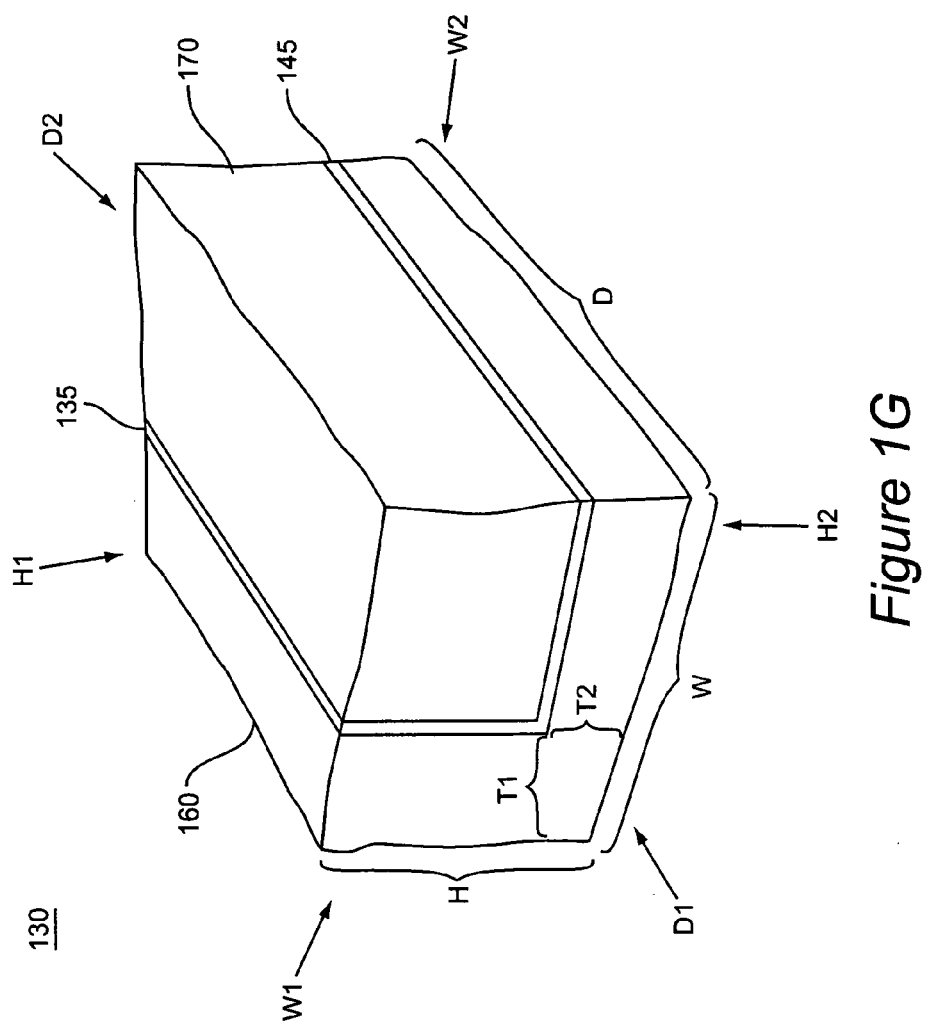
Figure 2A:
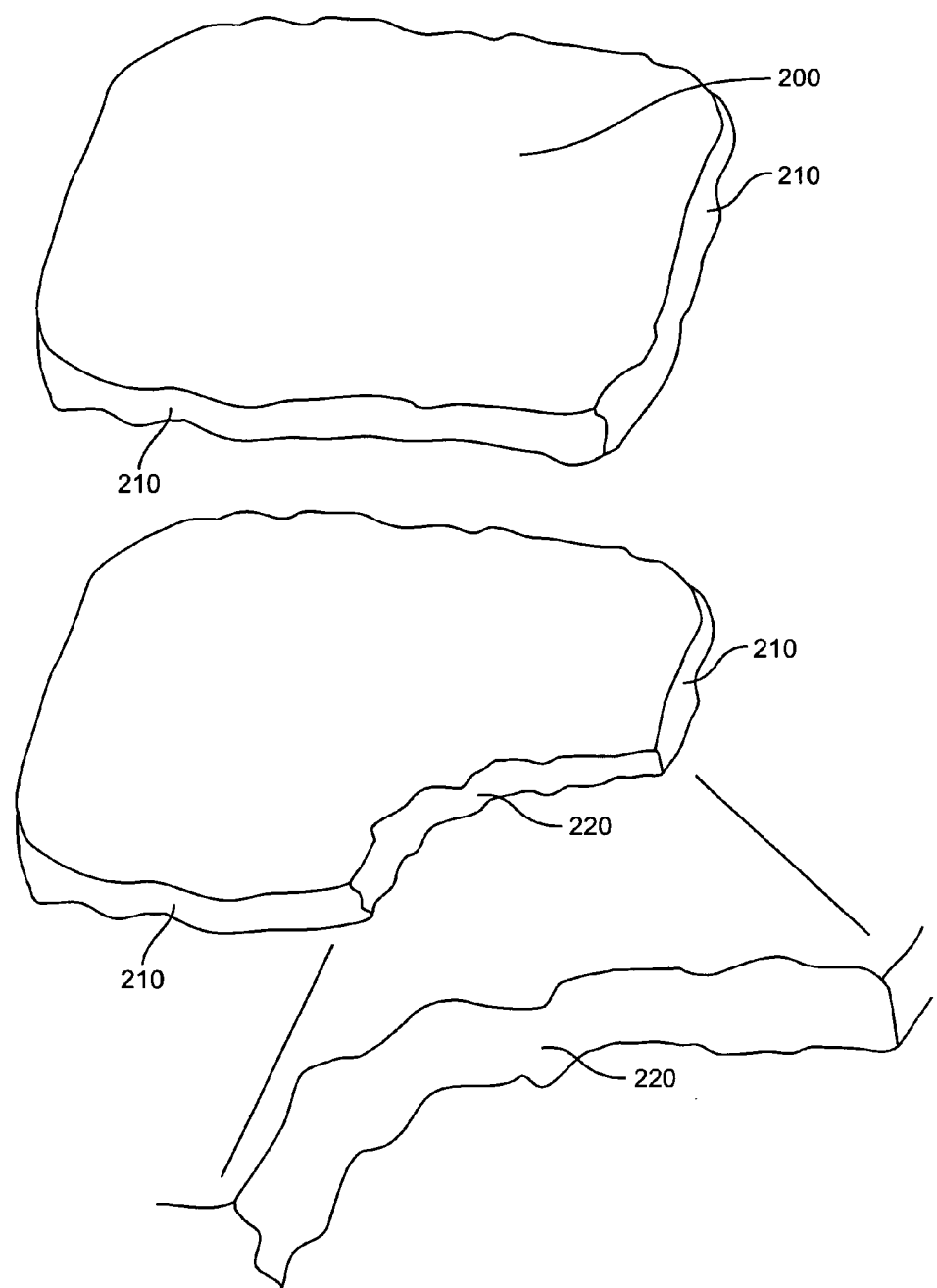
FIG. 2A shows a trimmed edge of thin stone.
Figure 2B:
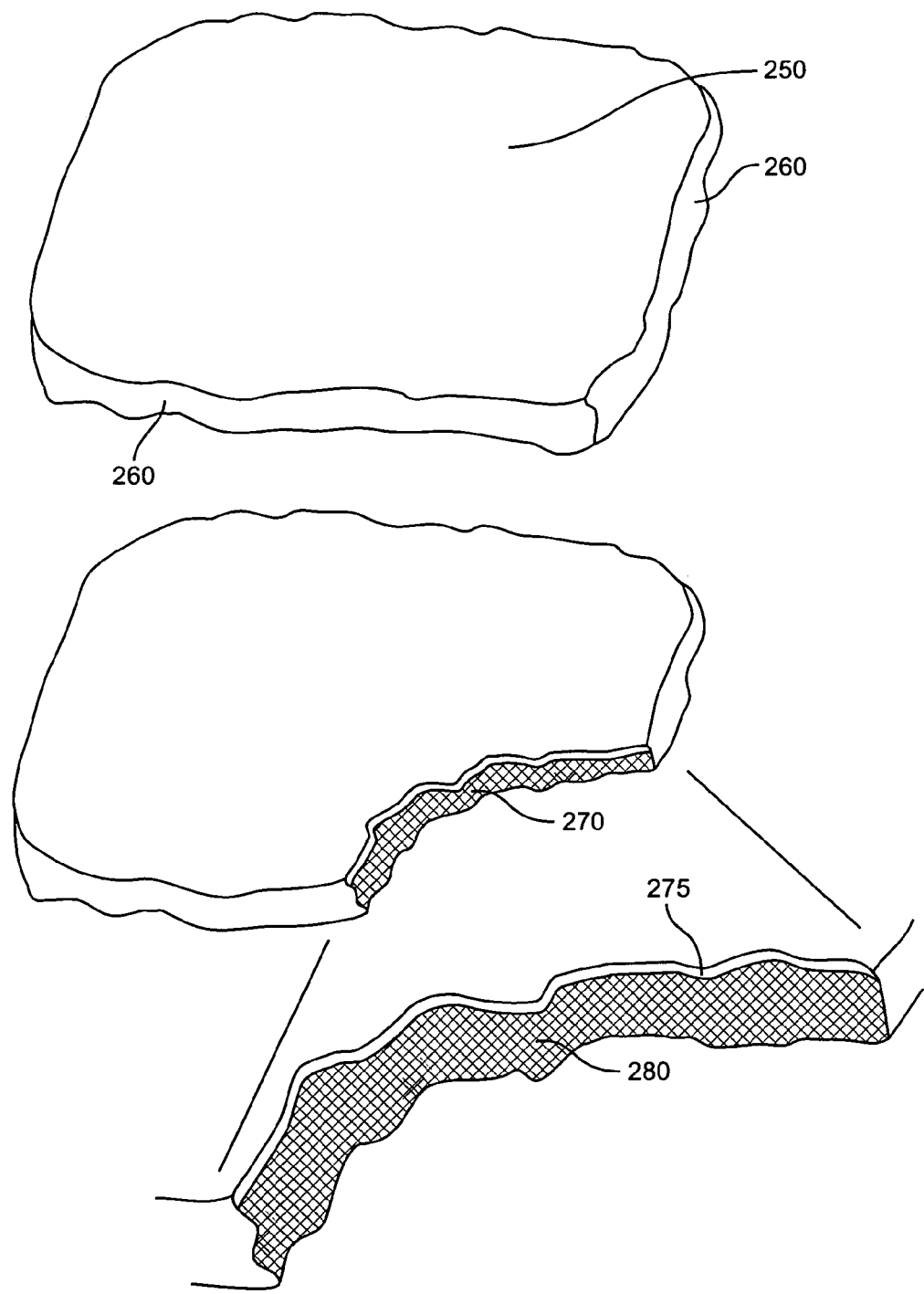
FIG. 2B shows a trimmed edge of culture stone.

The result of the cutting process is shown in a perspective drawing of the stone 130 in FIG. 1G. The stone 130 has height H, width W and depth D. Viewed in an orientation in preparation for the first cut 135, the top and bottom surfaces are labeled as H1 and H2, respectively. Left and right surfaces are labeled W1 and W2, respectively. Front and back surfaces are labeled D1 and D2, respectively. After second cut 145 the stone is separated into two pieces, the corner stone 160 and the residual piece 170. First cut 135 is at a distance T1 from left face W1 to a uniform depth of (H−T2) from top surface H1 toward bottom surface H2. Second cut 145 is at a distance T2 from bottom surface H2 to a uniform depth of (W−T1) from right surface W2 toward left surface W1.

Figure 5A:
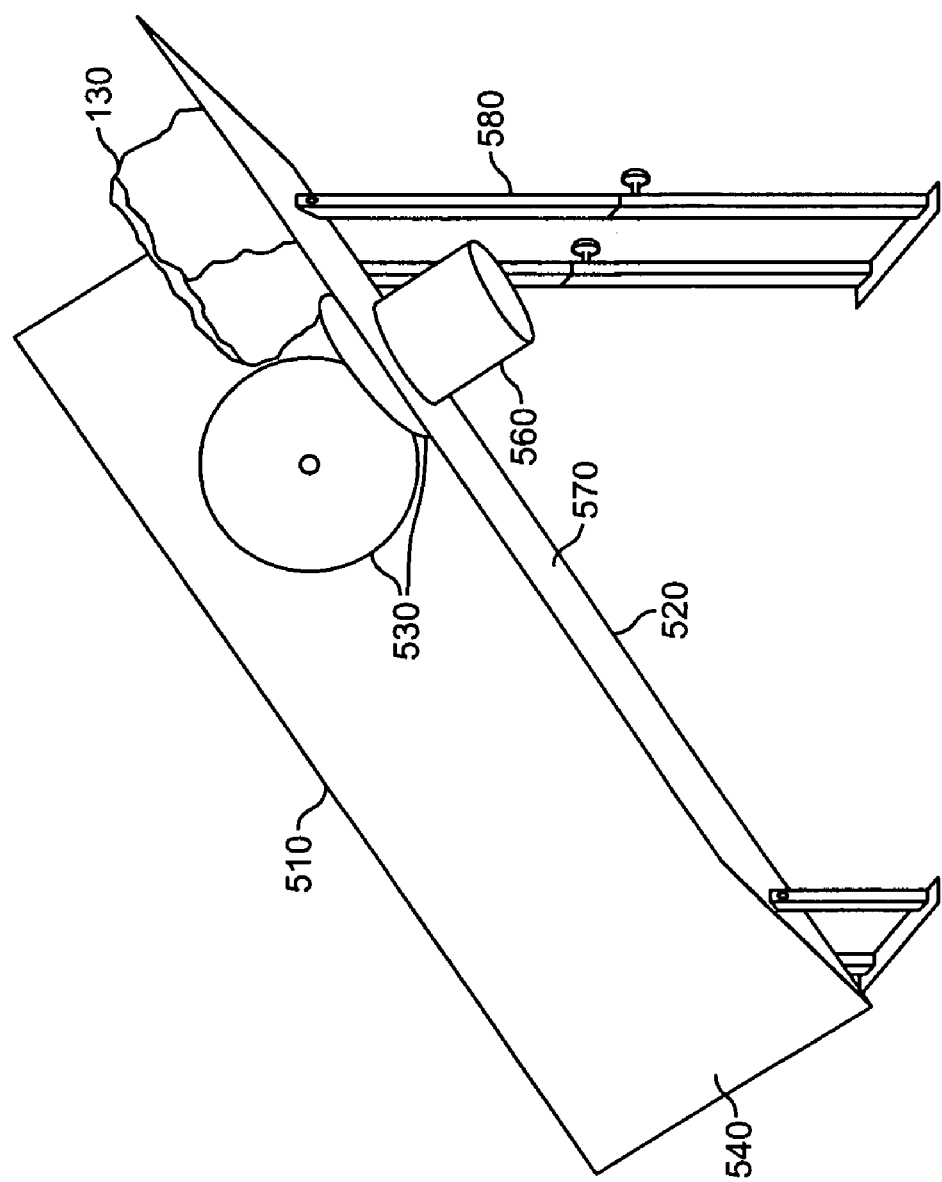
FIGS. 5A through 5C are a series of drawings showing how the second embodiment of the invention is implemented.

In a further implementation of the invention, the same stone workpiece 130 may be cut into corner stone 160 using a saw assembly having two saw blades, as shown in FIG. 5A. The stone workpiece is a reasonably square or rectangular stone between 10 inches and 3 inches in height, 10 inches and 3 inches in width, and 24 inches and 3 inches in length. The workpiece 130 is placed at the top of a "V" shaped inclined chute 510 formed of a sheet of 4'×8' one quarter inch steel bent lengthwise on the centerline to 90 degrees and set on adjustable legs 580 whereby the point of the "V" 520 points straight down and the chute 510 can be raised to any degree of incline from 10 degrees to 80 degrees. Gravity is used to pull the stone workpiece 130 down the chute 510 and through a set of spinning, 24 inch diameter stone cutting blades 530. The two blades 530 are mounted about three feet from the high end of the inclined chute, set at 90 degrees to each other with the cutting edge of the blades one-eighth inch apart, each blade being parallel to their respective inside face 540 of the chute 510, each blade being adjustable above their respective inside face 540 from one half to three inches, depending on the desired thickness of the respective side of the finished stone corner.

Figure 5B:
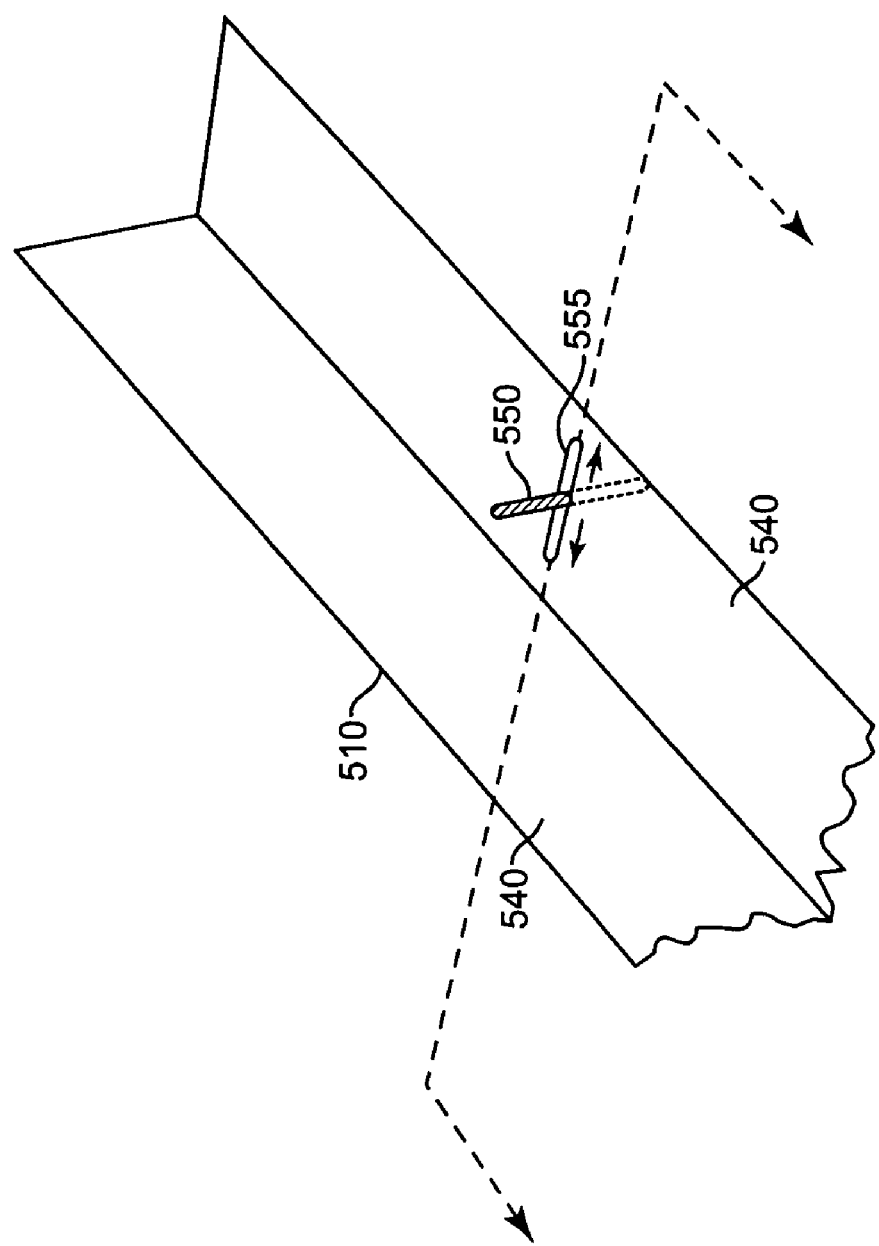

As shown in cutaway FIG. 5B, the saw blades (not shown in FIG. 5B) are mounted on their respective shafts 550 running back through a slot 555 in the chute 510 from their respective motors 560 (not shown in FIG. 5B), which are mounted on the outside face 570 of the chute in accordance with known art so as to be adjustable in and out (i.e. along the direction of the shaft) and up and down (i.e. laterally along the slot 555 in the respective side 540 of the chute 510, the slot 555 running perpendicular to the direction of travel of the workpiece 130 down the chute 510).

Figure 5C:
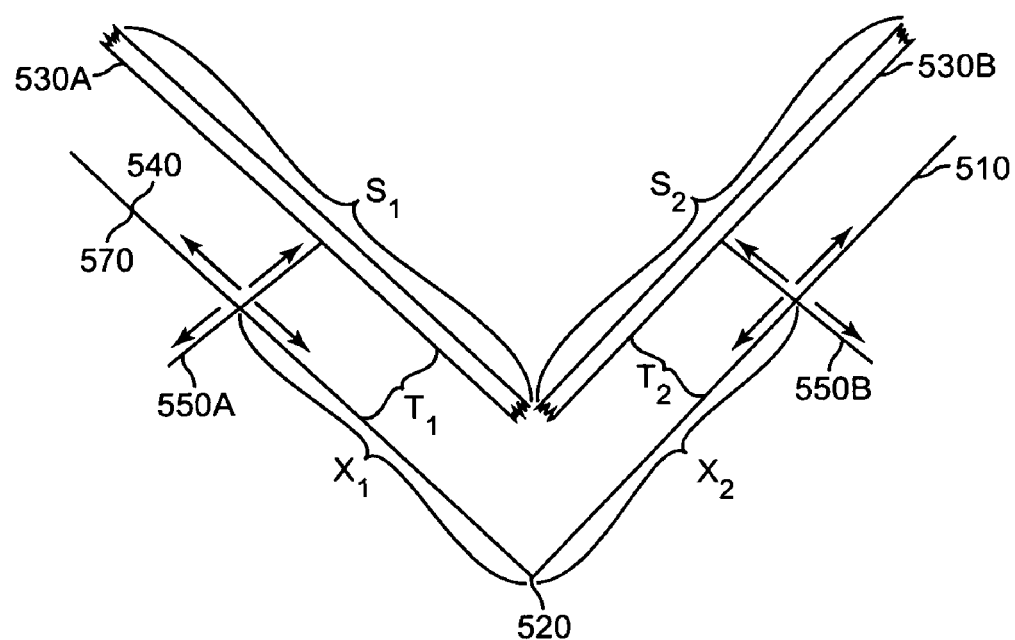

The positioning of the respective saw blades 530 by adjustment is shown with respect to FIG. 5C, which is a view along axis "L" (shown in FIG. 5B) of chute 510. The adjustment of the saw blades above the respective inside surfaces 540 is determined by the desired thicknesses T1 and T2, respectively, of the sides of the stone corner. The lateral adjustment along the slot 555 may be calculated as follows:

$$X1 = S1/2 + T2 + \alpha;$$

$$X2 = S2/2 + T1 + \alpha,$$

where X1 is the distance from the shaft 550A of the first saw 540A to the "V" corner 520 of the chute 510, S1 is the diameter of the first saw 540A, X2 is the distance from the shaft 550B of the second saw 540B to the "V" corner 520 of the chute 510, S2 is the diameter of the second saw 540B, and α is a small offset to achieve a blade separation of about one-eighth of an inch at the cutting edges. It will be observed that the dimensions H and W of the stone workpiece 130 must be less than X1 and X2, respectively, and as a practical matter the dimensions of H and W may be several inches less than the limits X1 and X2 in order to allow ample clearance between the workpiece 130 and the saw blade shafts 550 as the workpiece 130 travels down the chute 510.

The workpiece emerges in the shape of a 90 degree "L" non-seamed stone corner as shown in FIG. 1G, with a left over rectangle that if large enough can be run through the apparatus again producing another viable stone corner by orienting the residual stone so that its uncut sides are facing the respective sides of the chute.

Figure 3A:
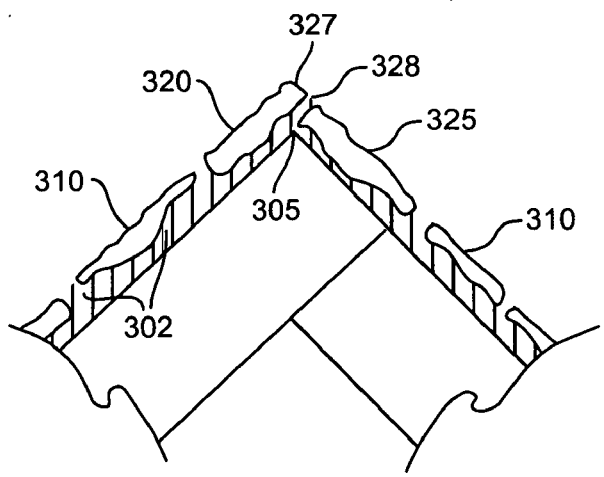
FIG. 3 is a series of cutaway drawings showing a top view of wall corners constructed from thin stone (FIG. 3A), thick stone (FIG. 3B), thin stone with corners cut in accordance with the invention (FIG. 3C), and culture stone (FIG. 3D).
Figure 3B:
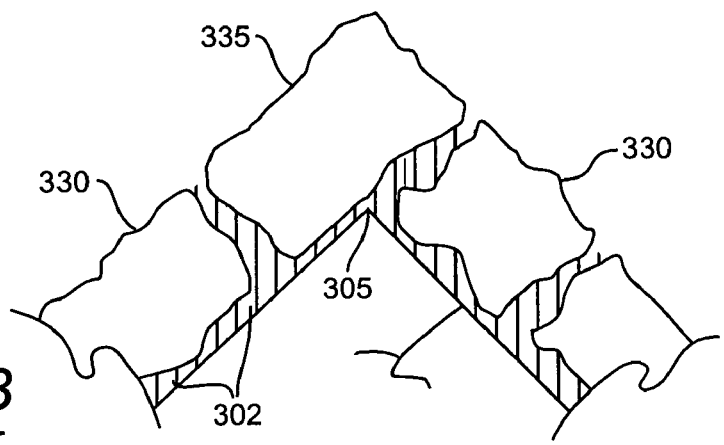
Figure 3C:
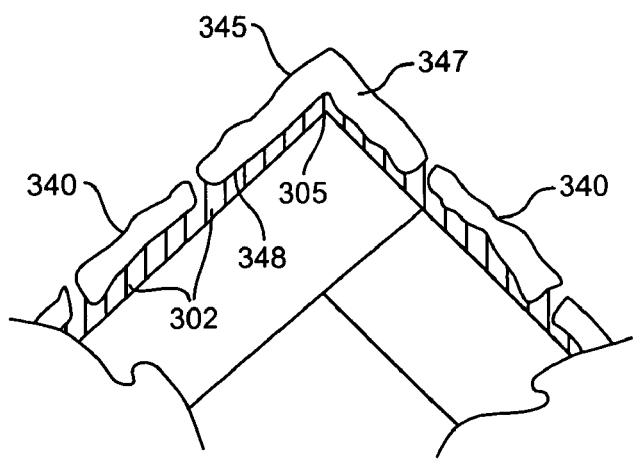

The stone corner 160 may now be laid in the wall, as may be seen with reference to FIG. 3C, which is a cutaway view from the top of the wall. Thin stones 340 have been laid along the field of the wall, with mortar 302. The new stone corner 160 is shown laid as item 345. Although only the top edge 347 and a portion of the back side 348 appears in the FIG. 3C, it is to be noted that the stone goes around the corner 305. It should also be noted that if the waste piece which is cut away, leaving corner piece 160, is itself a reasonably large square or rectangular stone (as described above), another corner piece can be constructed, provided the first and second cuts are such that neither of the two outer surfaces of the resulting corner piece (that is, the two surfaces which are visible when the corner is laid) were created by cuts 135 or 145 from the first corner piece. In this event, there is an additional economy from creating two corner pieces from a single building stone.

A thin stone wall having corner pieces in accordance with the invention may be contrasted with the prior art alternatives. A cutaway view from the top of the wall for the conventional thin stone veneer is shown in FIG. 3A. Thin stones 310 have been laid along the field of the wall, with mortar 302. A corner is made from thin stones 320 and 325, but it will be seen that there is visible on the corner 305 an edge 327 and a gap 328 which must be filled with mortar. A cutaway view from the top of the wall of a wall made with building stone in shown in FIG. 3B. Building stones 330 have been laid along the field of the wall, with mortar 302, and the corner is made from building stone 335. There is no concern about an illusion of building stone, because the wall is in fact constructed of building stone.

Figure 3D:
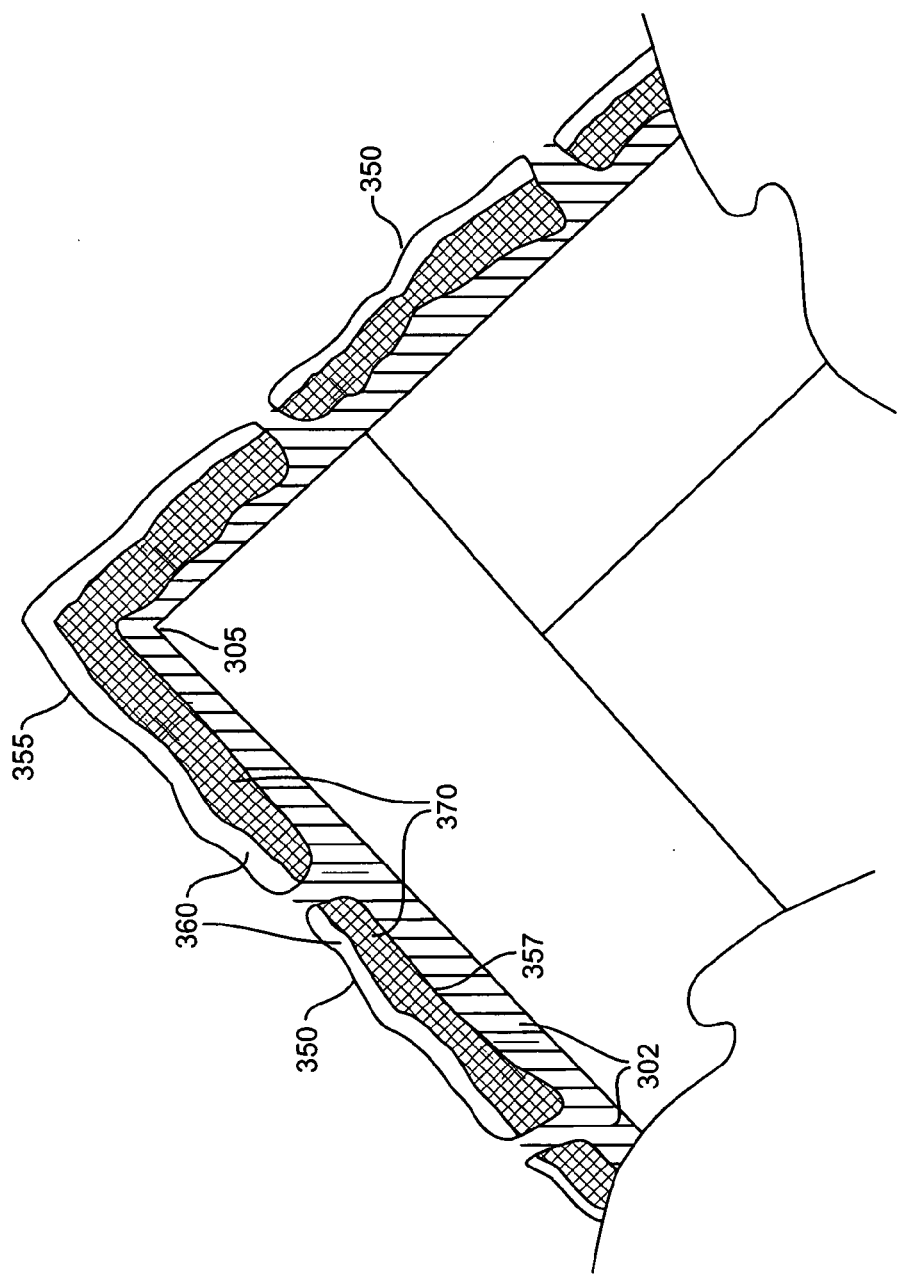

FIG. 3D shows a cutaway view from the top of a wall constructed with culture stone. Culture stones 350 have been laid along the field of the wall, with mortar 302. A Culture stone corner 355 is laid over corner 305. The back side 357 of the culture stone does not show from the front view of the wall. The cutaway perspective view shows the thin cladding 360 (not shown to scale) on the surface of the culture stones 350 and 355. The cutaway also shows, on the wall side of the culture stones 350 and 355 the interior concrete 370 over which the cladding 360 is formed.

Figure 4A:
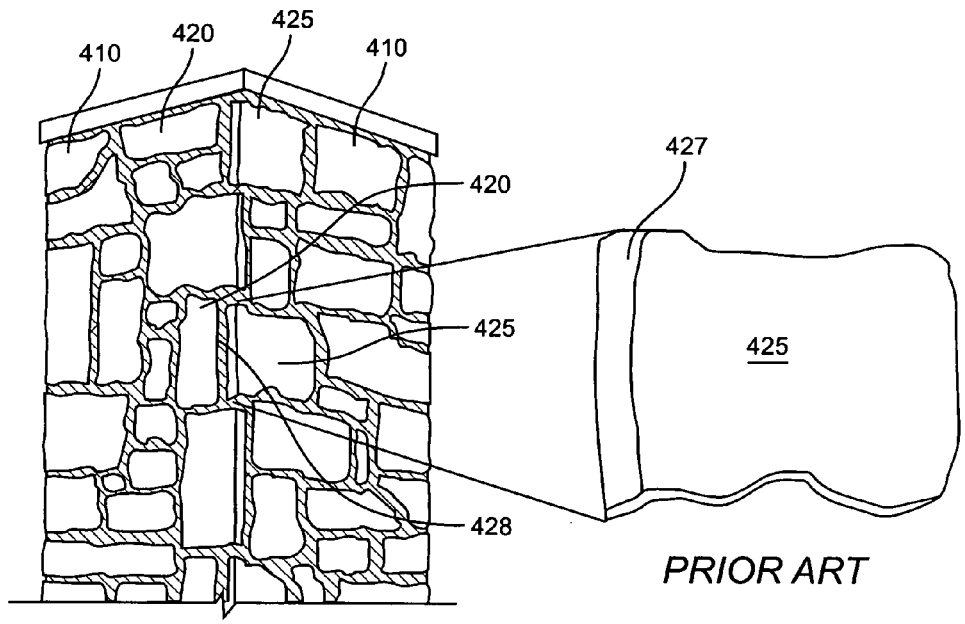
FIG. 4 is a series of perspective drawings showing an outside view of wall corners constructed from thin stone (FIG. 4A), thick stone (FIG. 4B), thin stone with corners cut in accordance with the invention (FIG. 4C), and culture stone (FIG. 4D).
Figure 4B:
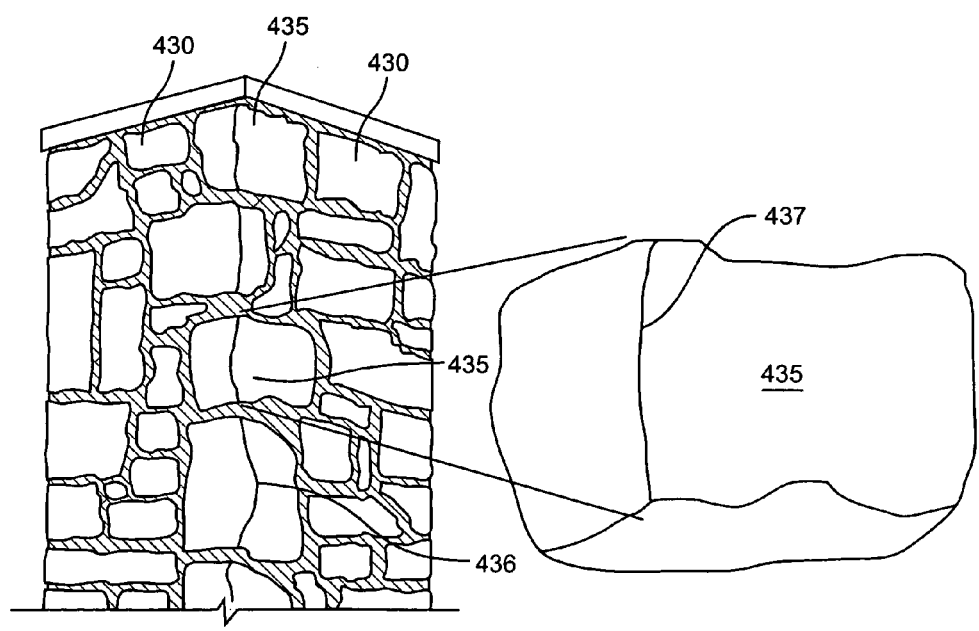
Figure 4C:
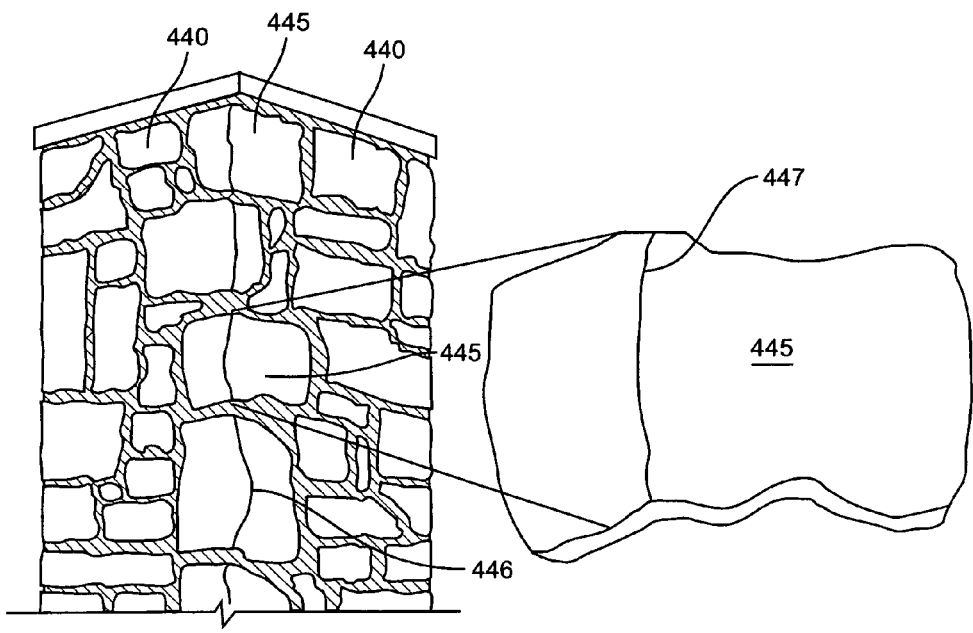
Figure 4D:
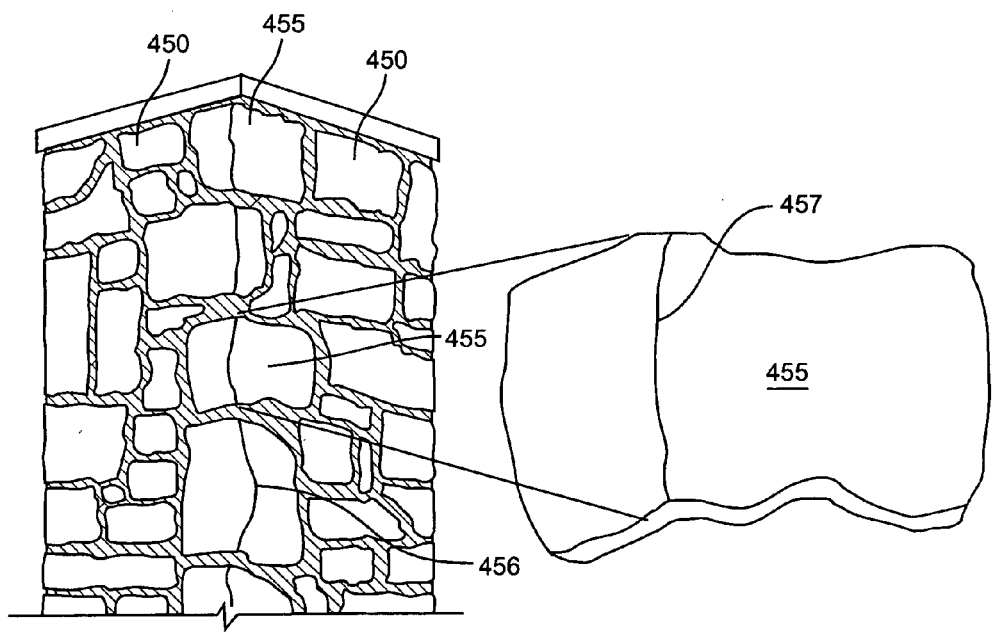

Turning now to FIG. 4C there is shown the external appearance of a wall constructed with corner pieces in accordance with the invention. Thin stones 440 are laid along the field of the wall, with corner pieces 445 set along the vertical corner edge 446. Note that the corner edge 447 of corner piece 445 is seamless. It should also be noted that a similar seamless corner appearance applies to a wall laid with building stone, as shown in FIG. 4B. Building stones 430 are laid along the field of the wall, and are also used as corner pieces 435 along vertical corner edge 436. Note that the corner edge 437 of stone 435 is seamless, being a solid building stone. Similarly, a wall laid with culture stone will have a seamless vertical corner edge, as shown in FIG. 4D. Culture stones 450 are laid along the field of the wall. Culture corner pieces 455 are laid along vertical corner edge 456. The corner edge 457 of culture corner piece 455 has a seamless appearance.

In contrast, the vertical corner edge of a wall laid with thin stone has a noticeable and undesirable seam, as shown in FIG. 4A. Thin stones 410 are laid along the field of the wall. At the corner a thin stone 425 is laid on one wall and a thin stone 420 is laid on the other wall. The edge 427 of thin stone 425 is visible on the corner. There is a mortar joint 428 between edge 427 and thin stone 420. The combination of edge 427 and mortar joint 428 along the vertical corner edge, forming an obvious and unsightly seam.

The invention improves upon all the prior art alternatives. It provides a seamless corner edge where two thin stone walls join. By using thin stone for laying the field of the wall, there is an advantage over building stone walls because thin stone is lighter, and therefore is less expensive and easier to transport and lay. And thin stone with cut corner pieces is more versatile than culture stone because it can be used in water, can be trimmed and flipped to fit in various spots in a wall, and can be cleaned with commercial acid based masonry cleaners.

While the invention has been described in terms of preferred embodiments, those skilled in the art will recognize that the invention can be practiced with modification within the spirit and scope of the appended claims.

Having thus described my invention, what I claim as new and desire to secure by Letters Patent is as follows:

1. A method of constructing non-seamed stone corners for first and second thin stone walls of thickness T1 and T2, respectively, said first and second walls being joined at right angles at an external edge, comprising the steps of:
    selecting a building stone having a height H, a depth D and a width W, said building stone having top and bottom surfaces H1 and H2, respectively, front and back surfaces D1 and D2, respectively, and left and right surfaces W1 and W2, respectively;
    orienting said building stone at the higher end of an inclined chute having perpendicular sides C1 and C2, such that surface W1 rests on side C1 and surface H2 rests on side C2;
    adjusting dual stone cutting saw blades B1 and B2 mounted perpendicularly to one another and parallel to respective sides C1 and C2 in said chute, such that the distance between blade B1 and side C1 is T1 and the distance between blade B2 and side C2 is T2, and the cutting edges of blades B1 and B2 have a clearance of about one-eighth of an inch;
    feeding said oriented building stone down said chute and through said saw blades; and
    removing from said building stone a residual piece, said removal step leaving said building stone remainder as a corner stone.

2. A method as in claim 1, further comprising the steps of:
    sandblasting said corner stone at surfaces formed by said first cut and said second cut; and
    laying said corner stone on said external edge joining said first and second thin stone walls.

3. A method as in claim 1, wherein the height H of said building stone is between three inches and ten inches, the width W of said building stone is between three inches and ten inches, the depth D of said building stone is between three inches and twenty-four inches, the thickness T1 of said first thin stone wall is one and one-half inches, and the thickness T2 of said second thin stone wall is one and one-half inches.

4. A method as in claim 1, said method further comprising the steps of:
    re-orienting said residual piece in preparation for cutting so that neither the surface facing side C1 nor the surface facing side C2 is formed by said first or second cuts, wherein the height H' of said re-oriented residual piece is between three inches and ten inches, the width W' of said re-oriented residual piece is between three inches and ten inches, the depth D' of said re-oriented residual piece is between three inches and twenty-four inches, said re-oriented residual piece having top and bottom surfaces H'1 and H'2, respectively, front and back surfaces D'1 and D'2, respectively, and left and right surfaces W'1 and W'2, respectively;
    orienting said re-oriented residual piece at the higher end of said inclined chute, such that surface W'1 rests on side C1 and surface H'2 rests on side C2;
    feeding said re-oriented residual piece down said chute and through said saw blades; and
    removing from said residual piece a second residual piece, said removal step leaving said residual piece remainder as a second corner stone.

5. A method as in claim 4, further comprising the steps of:
    sandblasting said second corner stone at surfaces formed by said third cut and said fourth cut; and
    laying said second corner stone on said external edge joining said first and second thin stone walls.

6. A method as in claim 4, wherein the thickness T1 of said first thin stone wall is one and one-half inches, and the thickness T2 of said second thin stone wall is one and one-half inches.

7. A method as in claim 2, wherein said corner stone is oriented so that said surface W1 of said corner stone is parallel to said first thin stone wall and said surface H2 of said corner stone is parallel to said second thin stone wall.

8. A method as in claim 5, wherein said second corner stone is oriented so that said surface W'1 of said second corner stone is parallel to said first thin stone wall and said surface H'2 of said second corner stone is parallel to said second thin stone wall.

9. A method as in claim 1, wherein said clearance is obtained by adjusting a lateral position of a shaft F1 of blade B1 and a lateral position of shaft F2 of blade B2 such that a nearest distance X1 along side C1 between shaft F1 and an edge joining sides C1 and C2 is determined by $$X1 = S1/2 + T2 + \alpha,$$

and a nearest distance X2 along side C2 between shaft F2 and said edge is determined by $$X2 = S2/2 + T1 + \alpha,$$

where S1 is the diameter of blade B1, S2 is the diameter of blade B2, and a is about one-eighth of an inch.

10. A method as in claim 4, wherein in said re-orienting step the residual piece is rotated one hundred eighty degrees counterclockwise about an axis between and perpendicular to front and back surfaces of the residual piece.

* * * * *